Figures 1, 6:
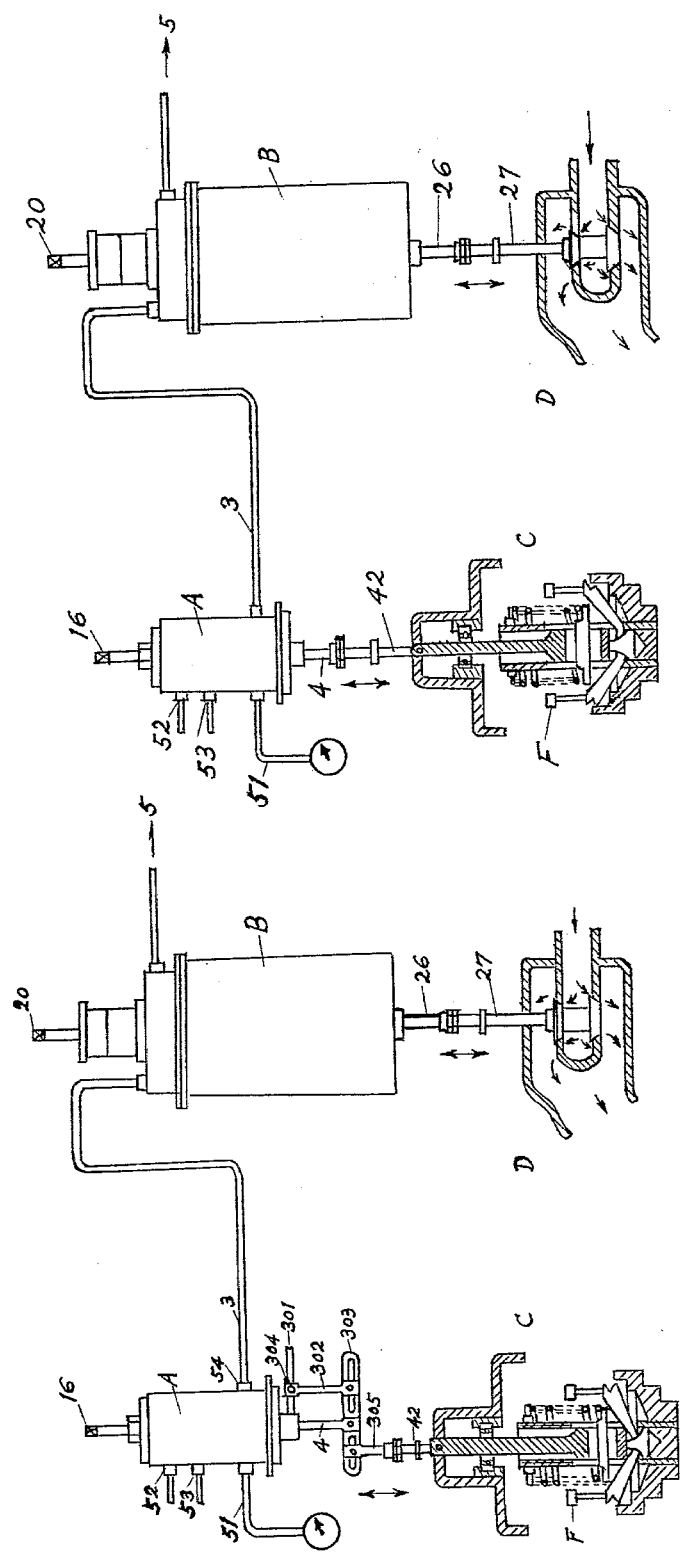

United States Patent [19]

Chiang

[11] 4,325,671
[45] Apr. 20, 1982

[54] SIGNAL WAVE LOADED PRESSURE OIL REMOTE CONTROLLER AND GOVERNOR

[75] Inventor: Nei-Ho Chiang, Kaohsiung, Taiwan

[73] Assignee: Yin-Lung Yang, Kaohsiung, Taiwan; a part interest

[21] Appl. No.: 956,188

[22] Filed: Oct. 30, 1978

[51] Int. Cl.³ .............................................. B23B 39/16
[52] U.S. Cl. ...................................... 415/43; 415/42; 91/458
[58] Field of Search ................. 123/140 MC, 140 FG, 123/379, 364; 60/39.28 R; 91/458, 366; 137/58; 251/28, 29; 415/36, 42, 43

[56] References Cited

U.S. PATENT DOCUMENTS

| | | | |
|---|---|---|---|
| 1,718,673 | 6/1929 | Wettstein | 91/458 |
| 2,665,585 | 2/1954 | Oestrich | 60/39.28 R |
| 2,667,935 | 2/1954 | Woodward | 60/39.28 R |
| 2,905,150 | 9/1959 | Ebert | 91/458 |
| 4,116,186 | 9/1978 | Drori | 123/140 FG |
| 4,125,104 | 11/1978 | Stein | 123/140 FG |
| 4,136,656 | 1/1979 | Sokolov | 123/140 FG |

*Primary Examiner*—Ronald H. Lazarus

[57] ABSTRACT

This invention relates to engine speed governor and is fully hydraulically actuated in proportion to sudden load changes of a steam turbo-generator engine. The invention comprises a transmitter and a receiver interconnected by tubings. Oil pressure from the engine lubricating system through a pressure reducing valve is used as an operating power for the transmitter and the receiver for operating engine main control valve. The transmitter comprises a control valve having two axially spaced apart pistons and internal oil passages, a fixed spring and an adjustable concentrical spring acting on the top piston of the control valve, a variable spring acting on the bottom piston of the control valve and is seated on a stem which is connected to engine speed measuring device such as fly-weight by a push rod and a center rod. The receiver comprises a power piston having a control rod connected to the engine main control valve; a pilot valve, having four axially spaced apart pistons and internal oil passages, which is movable mounted inside the working piston and a spring in between, a spring acting on the top of the power piston, an adjustable conical spring acting on the top of the pilot valve. Said transmitter and receiver are automatically balanced in their neutral positions by the said springs and oil pressure when the engine speed corresponds with the load changes, therefore no mechanical linkage for transmission of feed back motion is needed.

1 Claim, 6 Drawing Figures

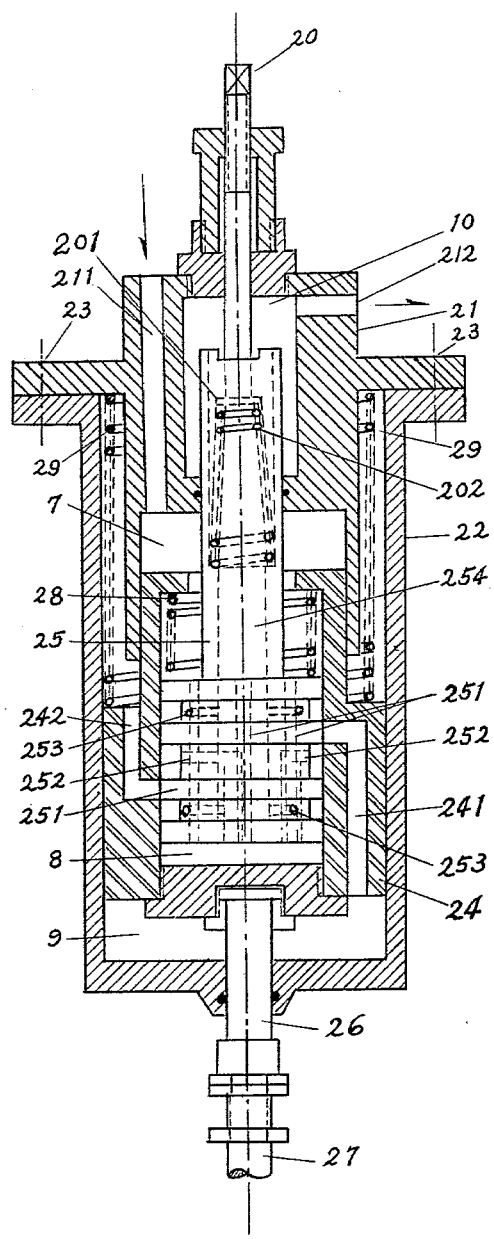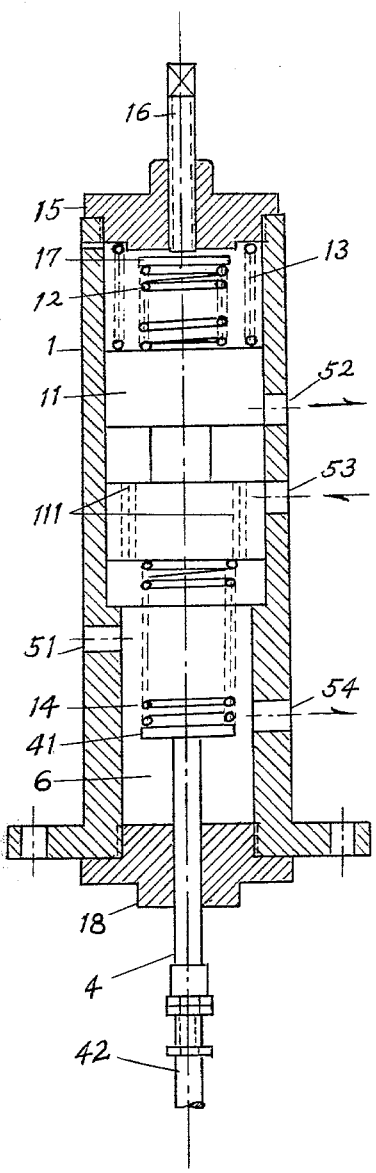
FIG. 3
FIG. 2

SIGNAL WAVE LOADED PRESSURE OIL REMOTE CONTROLLER AND GOVERNOR

Although various kinds and types of governors currently used on marine turbines manufactured by various companies are hydraulically actuated, usually they use mechanical linkages between pilot valve and power piston or throttle valve for the transmission of feed back motion to bring the pilot valve back to its neutral position. Therefore some mechanical loss in friction is unavoidable. Especially where the distance between the transmitting end and the receiving end is long.

It is an object of this invention to provide a fully hydraulically operated engine speed control without using any mechanical linkage or rod for feed back motion, thusly reducing the mechanical friction loss to a minimum.

Another object of this invention is to provide a simple structure consisting of a transmitter and a receiver connected by tubings for remote control regardless the obstructions of installation.

Still another object of this invention is to provide a convenience for easier adjustment.

Still another object of this invention is utilizing a comparative high pressurized oil to transmit a signal of pressure changes under the various load conditions, therefore minimize the fidelity loss and more accuracy and sensitivity is gained.

Other object of this invention is that it can be used for many other purposes with only a little modification on the components.

DESCRIPTION

Figure 4:
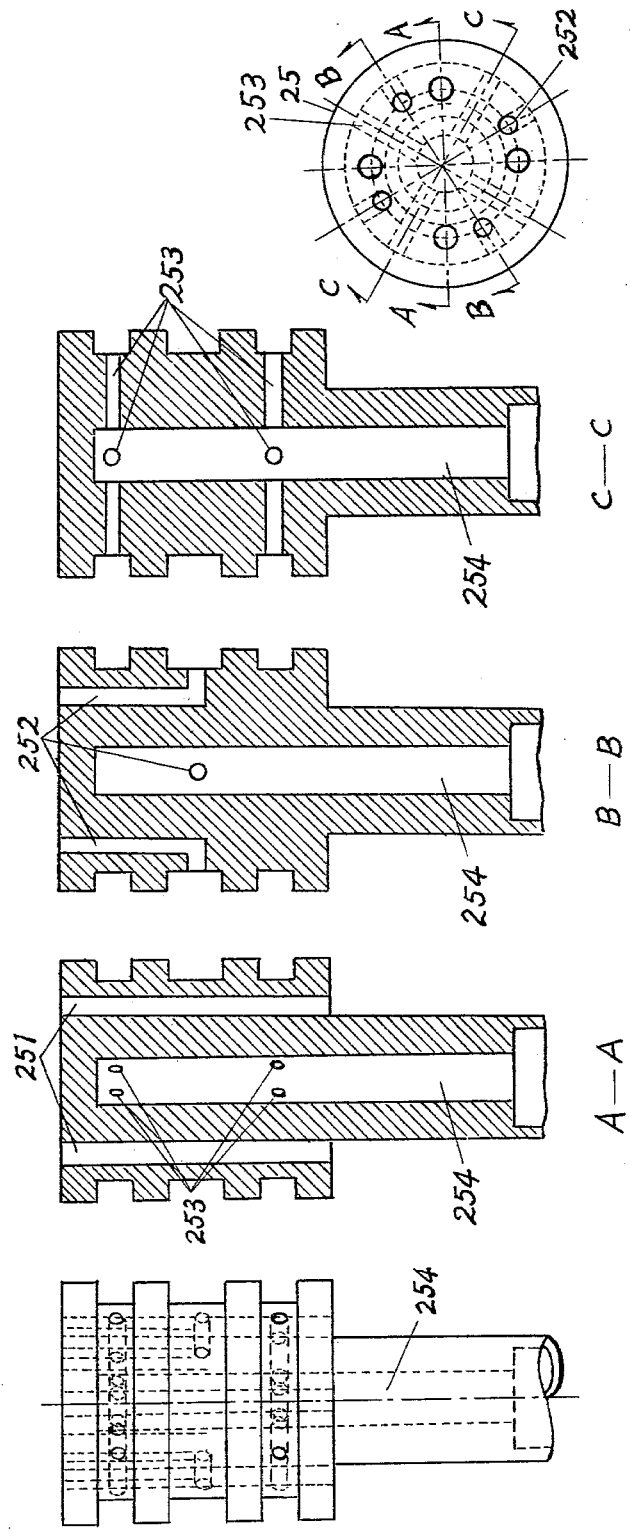
Figure 5:
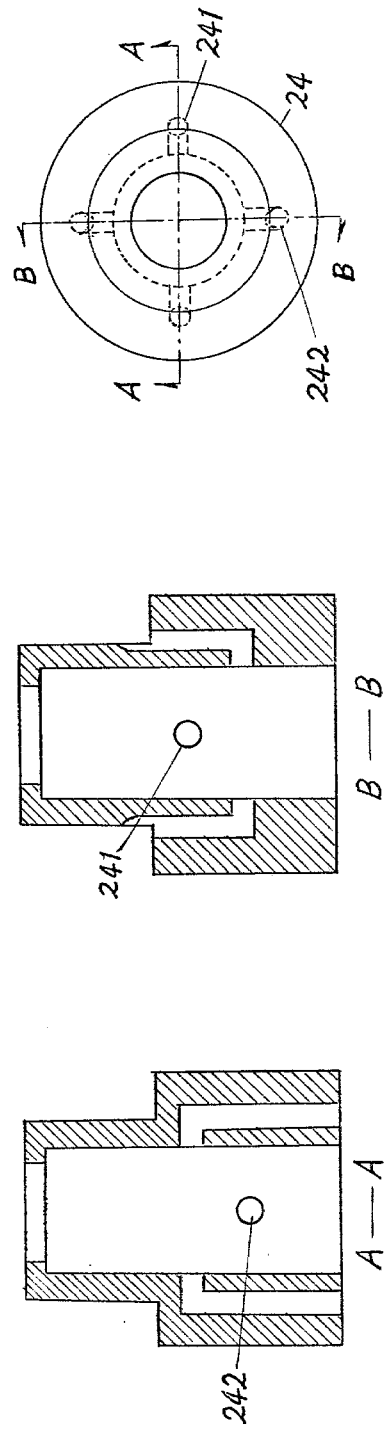

This invention consists of three parts:

a. Transmitter (A) (see FIGS. 1 and 2):

It is a cast iron cylindrical body 1 with four tubing connections 53, 54, 52, 51, one for pressure oil come in, one for oil out to receiver, one for oil return to drain and one for pressure gauge respectively. In the cylinder is a steel control valve 11 having two pistons upper and lower axially spaced apart and oil passages drilled in the lower piston. The control valve is balanced in position by concentrical coil springs 12, 13 acting on the top of the upper piston and a spring 14 and oil pressure acting on the bottom end of the lower piston. This control valve can move freely in the cylinder when the balancing pressure is changed. The spring 13 (outer) is comparative hard and the spring 12 (inner) is soft. The compression of the soft spring (12) can be adjusted by an adjusting screw 16 on the top of the transmitter. On the lower end of the control valve is a comparative soft spring 14 which is seated on a stem 41 and can be actuated by a push rod 4 under it. The motion of the push rod is transmitted from the center rod 42 which is mechanically connected to engine speed measuring device or fly-weight (C).

b. Receiver (B) (see FIGS. 1 and 3):

A cylindrical body of cast iron with an upper body 21 where oil holes are drilled therein, hole 211 for pressure oil to enter and hole 212 for drain oil goes out. In the lower cylinder is a cast iron power piston 24 (FIGS. 3, 5) with oil passages inside which is balanced in position by oil pressure at its top or bottom end and a spring 29 on its upper end. This power piston can be moved freely in the cylinder when the balancing pressure on it is changed. In the piston is a steel pilot valve 25 having four axially spaced apart pistons (FIGS. 3, 4) with oil passages inside which is balanced in position by the oil pressure on its bottom end and a comparative hard spring 28 and a soft conical spring 202 at its upper end. The hard spring 28 is located between the pilot valve and the piston and its compression is effected by the relative motion of the valve and piston. The compression of the comparative soft conical spring 202 located between the pilot valve and the upper body is effected only by the motion of the pilot valve. The compression of the latter can be adjusted by an adjusting screw 20 on the top of the receiver. At the lower end of the power piston is a piston rod 26 which is connected to the valve spindle 27 of the engine main control valve.

c. Tubing (see FIGS. 1, 2 and 3):

There are four copper tubings connected to the transmitter: 53 is a ⅜" oil supply tubing leading from lubricating oil pump through a common pressure reducing valve, 52 is an oil return tubing leading to the drain, 51 is for a pressure gauge connection, 54 is a ⅜" oil supply tubing leading to the receiver. There are two copper tubings on the receiver, one is oil supply tubing 3 leading from the transmitter, another one is a drain tube 5 which is leading to drain system of engine lubrication (see FIGS. 1 and 6).

OPERATION (see FIGS. 1, 2 and 3)

a. Starting and no load:

Before starting there is no RPM of the engine, the fly-weight F (see FIG. 1) has no centrifugal force and is at its innerest position, the center rod 42 (FIG. 1) and the push rod 4 (FIGS. 1, 2) of the transmitter (FIG. 1) are at its lowest position, at that time the control valve 11 (FIG. 2) is at its lowest position and open port 53 (FIG. 2). Pressure oil comes in from this port, through the oil passage 111 in the control valve, and goes out of the transmitter through opening 54 (FIG. 2) to the receiver. The oil from the transmitter enters in receiver from the passage 211 (FIG. 3) of the upper body 21, through chamber 7 (FIG. 3), passage between piston 24, pilot valve 25, and passages 251 in the pilot valve to chamber 8. The pressure oil in the chamber pushes the pilot valve 25 upward against springs 28 and 202, and opens the passage 241. The pressure oil in the chamber 8 flows through the passage 252 of the pilot valve and passage 241 of the power piston 24 to chamber 9 at bottom end of the piston. The oil in chamber 9 pushes the power piston 24 upward, and moves piston rod 26, and main control valve spindle 27 (FIGS. 3, 1) upward, causing the main control valve D (see FIG. 1) to open and admit steam pressure to speed up the engine to idling speed. After idling speed is attained, the centrifugal force causes the fly-weight come to its outer position and its center rod 42 (FIG. 1) goes up to its upper position. In the transmitter, the push rod 4 (FIG. 2) also rises to its upper position, so the compression of the spring 14 increases, and the transmitter delivers oil to receiver with low pressure corresponding to idling speed. Therefore the oil pressure in chamber 8 of the receiver decreases accordingly, causing a stop in the upward movement of the pilot valve 25 and the power piston, and a corresponding opening of the main control valve is maintained. Thus an equilibrium of the whole system is maintained at the idling speed, thus the control valve in the transmitter is at its neutral position with ports 52 and 53 closed. In the receiver, the pilot valve 25 in power piston 24 is at its neutral position with ports 241 and 242 are closed, and the power piston is at a position where the opening of the main control valve can meet the idling speed of the engine.

If the speed of the engine is increased, the fly-weights F (FIG. 1) moves further outward, the center rod of the fly-weight moves upward and also the push rod 4 rises (FIGS. 1, 2), causing the compression of the spring 14 (FIG. 2) increased. Since the oil pressure maintained in chamber 6 equals to that of the compression force of springs 13 and 12 (FIG. 2) minus the compression force of the spring 14, the delivering pressure of the transmitter will be decreased. Therefore the oil entering in the receiver decreases its pressure in the chamber 8 (FIG. 3). Wherein the pilot valve is moved downward with respect to the power piston, opens the ports 241 and 242 (FIG. 3). Whereas the pressure oil in the chamber 8 is going out through the passages 252 in the pilot valve and passages 242 in the piston, to the upper end of the power piston. So the power piston moves downward and transmits a motion to close the engine main control valve. The speed of the engine is then reduced until the idling speed is restored. Meantime the oil in the chamber 9 flows through passages 241 in the power piston, and passages 253 and center hole 254 in the pilot valve to chamber 10 and drains through passage 212 in the upper body 21.

b. Load increased:

When the load is increased, the engine speed will drop simultaneously, the fly-weights F (FIG. 1) comes to its inner position and the center rod 42 of the fly-weight comes downward. The compression of the spring 14 (FIG. 2) is decreased. The oil pressure in chamber 6 (FIG. 2) delivered to receiver is increased. The pressurized oil enters chamber 8 of the receiver (FIG. 3), causing the pilot valve 25 to move upward, which opens the ports 241 and 242 in the power piston 24. The pressurized oil in chamber 8 then flows through passages 252 in the pilot valve and 21 in the power piston to chamber 9, causing power piston to move upward. Meantime, the oil at the upper end of the piston flows through passage 242 in the power piston, the passages 253 and center hole 254 in the pilot valve to chamber 10 in the upper body 21, and drains through passage 212 to engine lubrication system. The upward movement of the power piston causes the spring 28 to reduce its compression and causes the pilot valve further upward movement. In sequence, the power piston and pilot valve further upward movement, till the increment of the oil pressure is balanced by the increasing compression force of the spring 202. When the power piston moves upward, the engine main-control valve opens in correspondence, the engine speed is increased accordingly. A new equilibrium of the whole system is now maintained when the engine is loaded.

c. Load decreased:

When the load of the engine is decreased, the engine speed will be increased simultaneously. The fly weights F (FIG. 1) reaches its outer position, and the center rod 42 of the fly-weight advances upward. The compression of the spring 14 (FIG. 2) is increased. The oil pressure in chamber 6 (FIG. 2) delivered to receiver is decreased. The decreased pressure oil flows into receiver to chamber 8 (FIG. 3), causing the pilot valve 25 (FIG. 3) to move downward. The downward movement of the pilot valve opens 241, 242 in the power piston 24. The pressure oil in chamber 8 then flows through passages 252 in the pilot valve and 242 in the power piston, to the upper end of the piston, causing power piston to move downward. Meantime, the oil at the lower end of the piston through passages 241 in the power piston, the passages 253 and center hole in the pilot valve to chamber 10 in the upper body 21, and drains through passage 212 to engine lubricating system. The downward movement of the power piston causes the spring 28 to increase its compression and causes the pilot valve further downward movement. In sequence, the power piston and the pilot valve moves downward until the decreased oil pressure is balanced by the decreasing compression force of the conical spring 202. When the power piston moves downward, the engine main-control valve closes correspondingly to it, engine speed is decreased accordingly. Hence a new equilibrium is maintained when the load of the engine is decreased.

ADJUSTMENT a. Speed increase adjustment:

Turn the adjusting screw 16 on the top of the transmitter A (FIG. 1) clockwise to increase the compression tension of the spring 12 (FIG. 2). The oil pressure delivered from the transmitter to receiver is increased, in this case the base constant pressure is increased without changing the signal wave loaded on it, therefore the oil pressure in chamber 8 (FIG. 3) in the receiver is increased, causing the opening of the engine main control valve increased accordingly. Hence, the engine speed at no load or full load is increased, adjusting the screw counterclockwise, the results are to the contrary.

b. Speed droop adjustment:

Put the engine operation on idling speed, turn the speed adjusting screw 16 clock-wise to increase engine speed, turn the speed droop adjusting screw 20 (FIG. 3) on the top of the receiver clockwise to bring the engine back to its original idling speed, put the engine operation on full load to check the speed droop increase.

By turning the speed adjusting screw counter-clockwise, and then turning the speed droop adjusting screw counter-clockwise, a decreasing speed droop is gained.

The reason for adjusting is based on that the spring 202 (FIG. 3) is a conical spring (or variable pitch helical spring). Increase (or decrease) the compression tension of the spring will decrease (or increase) its effective coils (or stiffness) of the spring.

Force relations in transmitter and receiver:

a. In the transmitter:

Let:

$F_1$ = Difference of length in centimeters of spring 14 at no load and full load.

= Stroke in centimeter of push rod from no load to full load.

= $S_1$

CP = Load in kgs. of spring 13 when control valve 11 at neutral position = constant AP = Load in kgs. of spring 12 when control valve is at neutral position = constant (but adjustable).

$BP_1$ = Load in kgs. of spring 14 at no load.

$BP_2$ = Load in kgs. of spring 14 at full load.

$OP_1$ = Pressure in kgs. per sq. cm. of oil delivered from transmitter at no load.

$OP_2$ = Pressure in kgs. per sq. cm. of oil delivered from transmitter at full load.

$a_1$ = Effective area in sq. cm. of control valve under pressure.

Then:

$S_1 (= F_1)$ Proportional to $(OP_2 - OP_1)$ $OP_1 = (AP + CP - BP_1)/a_1$ $OP_2 = (AP + CP - BP_2)/a_1$ b. In receiver:

The oil pressure in the receiver can be divided into two components of base pressure and signal wave.

The pressure oil in the receiver will function subsequently as follows:

1. Maintain the pilot valve at its idling speed in a neutral position by its base pressure.
2. Control the movement of pilot valve between no load and full load by its signal wave pressure.
3. Push the power piston up or down by its pressure energy.

Let:

$F_2$ = Difference of length in cms. of spring 202 at no load and full load = stroke in cms. of piston rod 26 from no load to full load = $S_2$ $LP_1$ = Load in kgs. of spring 202 at no load.
$LP_2$ = Load in kgs. of spring 202 at full load.
$MP_1$ = Load in kgs. of spring 29 at no load.
$MP_2$ = Load in kgs. of spring 29 at full load.
$NP$ = Load in kgs. of spring 28 when pilot valve 25 is at neutral position relative to power piston 24 = constant
$a_2$ = Effective area in sq. cms. of pilot valve 25 under pressure.
$a_3$ = Effective area in sq. cms. of power piston under pressure.

Then:

$S_2(=F_2)$ proportional to $(OP_2 - OP_1)$ & $(=F_1)$.
$OP_1 = (NP + LP_1)/a_2 = (AP + CP - BP_1)/a_1 = MP_1/a_3$
$OP_2 = (NP + LP_2)/a_2 = (AP + CP - BP_2)/a_1 = MP_2/a_3$ Modification And Further Illustration:

a. Used without the spring 202 in receiver:

If the governor used without the spring 202 in the receiver, the pilot valve 25 will stay in its neutral position relative to power piston 24 where the control oil pressure is balanced by the compression of the spring 28 only. Any change of the control oil pressure caused by engine load, will cause the power piston to move continuously toward one direction, till the engine returns to its original speed and the control oil pressure returns to its original value. In this case, an over-control and damaging of the engine may happen.

b. Governor used with the conical spring substituted by common helical spring:

1. Helical spring used without other modification:

If the spring 202 (FIG. 3) is substituted by a helical spring, the governor will be a constant speed droop governor. The first step in adjusting the adjusting screw 16 on the transmitter will change both the engine speed at no load and full load. Second step in adjusting the adjusting screw 20 on the top of the receiver will bring the engine back to its original speed. The result of former adjustments will change the pressure of the control oil only. In this case, the governor will be a constant speed droop governor. This kind of governor is not satisfactory for generators used in parallel.

2. Helical spring used in substitution and with connection of receiver to fly-weight modified (see FIG. 6):

Helical spring used in substitution and modify the connection of the push rod 4 of the transmitter and the center rod 42 of the fly-weight as FIG. 6. The speed droop of the governor can also be adjustable. The reason is as follows:

(1) Construction of the connection (see FIG. 6):

The adjusting rod 302 is supported by the supporting arm 301, and can be moved on the arm by loosening the set screw 304 on its top. The lever 303 is a lever with slots on its two ends. The center rod 42 of the fly-weight, the push rod 4 of the transmitter and the adjusting rod 302 are pin connected to the lever 303 by pin x, y and z respectively.

(2) Speed droop adjustment (FIG. 6):

In FIG. 6 from no load to full load the stroke of the push rod 4 of the transmitter is proportional to the movement of the center rod 42 of the fly-weight. Moving the adjusting rod 302 toward or off the transmitter will change the proportion correspondingly. In illustration from no load to full load the stroke of the piston rod 26 of the receiver is proportional to the stroke of the push rod 4 of the transmitter. So that moving the adjusting rod 302 toward or from transmitter will change the stroke of the push rod from no load to full load. The stroke of the piston rod 26 (or spindle of the control valve 27 will also change proportionally). The function of the adjustment is to vary the tension of the helical spring mentioned. Therefore the speed droop adjustment will be as follows:

Increasing speed droop:

Loosen the set screw 304 on the top of the adjusting rod 302. Slide the adjusting rod toward the transmitter along the supporting rod 301 and tighten the set-screw. This adjustment will increase the speed of the engine. Then turn the speed droop adjusting screw 20 on the top of the receiver clockwise to decrease the idling speed back to the original value. Put the engine running on full load and see how much the speed droop is increased (or full load speed decreased).

Decreasing speed droop:

Loosen the set screw 304 on top of the adjusting rod 302. Move the adjusting rod from the transmitter along the supporting rod 301 and tighten the set screw. This will decrease idling speed of the engine. Then turn the speed droop adjusting screw 20 on the top of receiver counter-clockwise to increase the idling speed back to the original value. Put the engine running on full load and see how much the speed droop is decreased (or full load speed increased).

c. Governor used in conjunction with safety devices:

Leading branch tubes out from the tube 3 (FIG. 1) between the transmitter and the receiver, safety devices such as low lubricating oil trip, low vacuum trip and manual trip can be connected to the system. By releasing the governor control oil pressure through the functions of these devices, the engine will stop running due to the oil pressure in the receiver of the governor being released.

Application of the device used other than a governor:

a. As remote control device for full opening or closing (or forward or back) movement: Remove the conical spring 202 in the receiver. Let the movement of the push rod 4 of the transmitter be actuated by common manual can operating device etc. The pressure of the control oil delivered from the transmitter to receiver will correspond to the movement of the cam. In this case, a higher or lower oil pressure than the compression force of the spring 28 in the receiver where the pilot valve 25 is at neutral position, the power piston will move downward or upward. Hence an opening or closing (or forward or back) movement will be transmitted by the power piston rod.

b. As remote control device for metering of opening or closing (or forward and back) movement: Use a common helical spring in substitution of the conical spring 202 in the receiver. Let the push rod 4 of the transmitter be actuated by a common manual cam operating device etc. The pressure of the control oil delivered from the transmitter to the receiver will correspond to the movement of the cam. In this case, after rising the control oil pressure to a predetermined value, the power piston will start to move from its closed position. Further increase of the pressure of the control oil, a metering movement of opening (or forward) will be delivered by the power piston corresponds to the magnitude of the increment of the pressure. If lowering the pressure of the control oil to receiver, the result will be to the contrary.

What I claim is:

1. An engine speed governor for use on a steam turbo-generator, comprising:

a steam turbo-generator engine crankshaft speed measuring device, a transmitter for converting axial movement of the speed measuring device into a signal wave oil pressure and transmitting oil pressure from the steam turbo-generator engine lubricating system through a pressure reducing valve of any known type as a base pressure to combine with said signal wave oil pressure as a working pressure for the present invention, comprising:

a cylindrical body having four ports on the side wall of the cylindrical body, said ports are connected by means of tubings to an oil pressure indicator, a return to the said lubricating system, a pressure line from the said lubricating system through said pressure reducing valve which is in between the transmitter and the steam turbo-generator engine lubricating system, and a pressure line to a receiver respectively, a control valve consisting of two pistons axially spaced apart and fixedly connected together by a short central rod, said piston one above the other are axially movable in the cylindrical body dividing the cylindrical body into three chambers, the upper, the middle and the lowest chambers, oil passages provided on the lower one of the said piston communicating the lowest chamber to the middle chamber of the cylindrical body, a spring means acting on the bottom face of the lower piston, other end of the spring being seated on a stem wich is mechanically connected to the said steam turbo-generator engine crank shaft speed measuring device, two concentrical springs means are provided thereon the top face of the upper piston, the inner one of the two springs being adjustable to vary the base pressure by an adjusting screw which is protruded from the top center of the cylindrical body, means for moving the piston of the control valve to a balanced position by said springs on the top face of the upper piston against the oil pressure in the lowest chamber of the cylindrical body plus the spring tension on the bottom face of the lower piston which is compressed by axially movement of the speed measuring device, at the moment of this balanced condition said port connecting to the return line and the other port connecting to the pressure line from the pressure reducing valve are both shut off by the pistons of the control valve simultaneously, means for converting the axial movement of the speed measuring device into oil pressure by changing the balance force on the pistons of the control valve, the more compression of the spring on the bottom face of the lower piston by the axial movement of the speed measuring device, the less oil pressure in the lowest chamber of the cylindrical body of the transmitter will be transmitted to the receiver, a steam turbo-generator engine main control valve for either increasing or decreasing of steam pressure to the steam turbo-generator engine, a receiver for use to convert said working pressure from the transmitter into axially movement of a spindle to actuate the engine main control valve, the receiver is also used to provide a feed back motion to bring the control valve of the transmitter to its neutral balanced position hydraulically, comprising:

a cylindrical body having a top cover, two ports on the top cover are connected by means of tubings, one of them leading the oil pressure from the lowest chamber of the cylindrical body of the transmitter, the other one being connected to a return line to the said lubrication system, a power piston axially movable in the cylindrical body of the receiver being fixedly connected with a spindle to the engine main control valve, a pilot valve consisting of four pistons axially spaced apart being axially movable in the power piston, oil passages drilled in the power piston and in the pilot valve for directing the oil pressure from the transmitter to the bottom end of the power piston as the pressure is increased from the lowest chamber of the transmitter which occurs when the speed of the steam turbo-generator engine drops, this movement results in the power piston moving up to open the engine main control valve and bringing back the engine speed, vice versa, spring means provided between the piston and the pilot valve, and between the power piston and the top cover, a conical spring on the top of the pilot valve being adjustable by an adjusting pin which is protrude from the center of the top cover for speed drop adjustment, means provide in the receiver to give a feed back action to the transmitter by the said springs and said oil passages hydraulically.

* * * * *